(12) United States Patent
Moriwaki et al.

(10) Patent No.: US 7,212,525 B2
(45) Date of Patent: May 1, 2007

(54) PACKET COMMUNICATION SYSTEM

(75) Inventors: Norihiko Moriwaki, Kokubunji (JP); Hidehiro Toyoda, Musashino (JP)

(73) Assignee: Hitachi, Ltd., Tokyo (JP)

( * ) Notice: Subject to any disclaimer, the term of this patent is extended or adjusted under 35 U.S.C. 154(b) by 917 days.

(21) Appl. No.: 10/046,304

(22) Filed: Jan. 16, 2002

(65) Prior Publication Data
US 2002/0191626 A1 Dec. 19, 2002

(30) Foreign Application Priority Data
Jun. 19, 2001 (JP) ............................... 2001-184227

(51) Int. Cl.
*H04L 12/50* (2006.01)
*H04Q 11/00* (2006.01)

(52) U.S. Cl. ...................... 370/386; 370/390; 370/398; 370/395.2; 370/395.4; 370/412; 370/413; 370/422; 370/428

(58) Field of Classification Search ...................... None
See application file for complete search history.

(56) References Cited

U.S. PATENT DOCUMENTS 5,251,206 A * 10/1993 Calvignac et al. .......... 370/352
5,550,815 A * 8/1996 Cloonan et al. ............ 370/396
5,600,469 A * 2/1997 Yamazaki .................... 398/98
6,185,221 B1 * 2/2001 Aybay ........................ 370/412
6,661,788 B2 * 12/2003 Angle et al. ................ 370/390

OTHER PUBLICATIONS

McKeown, et al., "Tiny Tera: A Packet Switch Core", IEEE Micro, Jan./Feb. 1997, pp. 26-33.

* cited by examiner

*Primary Examiner*—Chi Pham
*Assistant Examiner*—Raj K. Jain
(74) *Attorney, Agent, or Firm*—Mattingly, Stanger, Malur & Brundidge, P.C.

(57) ABSTRACT

A Packet communication system has a first line interface; a second line interface that accommodates lines slower than lines accommodated by the first line interface; a crossbar switch; and a scheduler that periodically receives packet output requests from the first and second line interfaces and sends grants based on the requests for the crossbar switch to the first and second line interfaces. The link capacity between the first line interface and the crossbar switch is made higher than that between the second line interface and the crossbar switch, whereby a packet communication system capable of accommodating line interfaces with different speeds efficiently can be provided.

12 Claims, 16 Drawing Sheets

FIG.16

| | OUTPUT#1 | OUTPUT#2 | OUTPUT#3 | OUTPUT#4 | 411 | 412 |
|---|---|---|---|---|---|---|
| 401 Rx1 | 1 (REQUEST) | 0 (NO-REQUEST) | 0 (NO-REQUEST) | 1 (REQUEST) | 1 (VALID) | |
| 402 Rx2 | 1 (REQUEST) | 0 (NO-REQUEST) | 0 (NO-REQUEST) | 0 (NO-REQUEST) | | 1 (VALID) |

FIG.17

| | OUTPUT#1 | OUTPUT#2 | OUTPUT#3 | OUTPUT#4 | 411 | 412 |
|---|---|---|---|---|---|---|
| 401 Rx1 | 1 (REQUEST) | 0 (NO-REQUEST) | 1 (REQUEST) | 0 (NO-REQUEST) | 1 (VALID) | |
| 402 Rx2 | d.c. | d.c. | d.c. | d.c. | | 0 (INVALID) |

FIG.18

| | OUTPUT#1 | OUTPUT#2 | OUTPUT#3 | OUTPUT#4 | 511 |
|---|---|---|---|---|---|
| A×1 (501) | 0 (NO-REQUEST) | 1 (REQUEST) | 0 (NO-REQUEST) | 0 (NO-REQUEST) | 1 (VALID) |
| A×2 (502) | 0 (NO-REQUEST) | 0 (NO-REQUEST) | 0 (NO-REQUEST) | 1 (REQUEST) | 1 (VALID) |

FIG.19

| | OUTPUT#1 | OUTPUT#2 | OUTPUT#3 | OUTPUT#4 | 511 |
|---|---|---|---|---|---|
| A×1 (501) | 1 (REQUEST) | 0 (NO-REQUEST) | 0 (NO-REQUEST) | 0 (NO-REQUEST) | 1 (VALID) |
| A×2 (502) | d.c. | d.c. | d.c. | d.c. | 0 (INVALID) |

PACKET COMMUNICATION SYSTEM

BACKGROUND OF THE INVENTION

The present invention relates to a packet data communication system that switches IP (Internet Protocol) variable-length packets and asynchronous transfer mode (referred to as ATM below) fixed-length packets (generally referred to as cells).

In recent years, data traffic on the Internet and other networks has been increasing rapidly. In addition, there is a trend to try to provide services on the Internet having the same high quality and reliability as transactions that have been carried out on leased lines. To keep up with this trend, it is necessary to provide higher-capacity, higher-speed, higher-reliability packet data communication systems.

It is known that a switch of the input-output buffer type provides a switching architecture suitable for packet data communication systems in terms of high capacity. A packet switching system using an input-output buffer type switch is disclosed in "The Tiny Tera: A Packet Switch Core" by Nick McKeown, Martin Izzard, Adisk Mekkittikul, William Ellersick, and Mark Horowitz (IEEE MICRO, January/February, 1997) (referred to as "document 1" below). The switch disclosed by document 1 can be regarded as being substantially the same as the one shown in FIG. 26. A crossbar switch 706 with n input and output ports has n port cards 701 in the front stage, and each of the port cards 701 includes an input buffer 703. A variable-length packet that has been input from an ingress line 700 is sliced into fixed-length packets (cells). Cells that have been buffered in the input buffer 703 are output from each of the port cards 701 after connection scheduling has been carried out for setting connections between input and output ports by a scheduler 705, and the cells are switched in the crossbar switch 706. Scheduling of connections between the input and output ports is performed on a per cell basis. In particular, this structure comprises input buffers 703 divided into queue buffers (virtual output queues (VOQs)) for each output port and enables a cell to be read out from any queue buffer given an output order by the scheduler 705, thereby preventing the reduction of throughput due to Head of Line (HOL) blocking. The crossbar switch 706 slices a cell 704 into units of a plurality of bits, for example, and switches them parallely in a plurality of switching planes.

Conventional packet data communication systems are capable of supporting various line speeds. FIG. 3 shows the structure of the data path system of a typical packet data communication system that supports a plurality of line speeds. The crossbar switch 750 in FIG. 3 includes a plurality of 2.4-Gbps input ports and a plurality of 2.4-Gbps output ports, and switches n×n connections between the input and output ports. The physical connections between the crossbar switch 750 and the line interfaces are made by 2.4-Gbps drivers (transmitting units) 730 and 2.4-Gbps receivers (receiving units) 731. This example represents a structure supporting not only a 2.4-Gbps line interface 721, but also line interfaces supporting various lower-speed lines. A line interface generally supports a plurality of ports with lower-speed lines for efficient line accommodation of packet data communication systems. FIG. 3 shows an example in which a line interface 722 accommodates four ports with 600-Mbps lines; a line interface 723 accommodates sixteen ports with 150-Mbps lines; and a line interface 724 accommodates two ports with gigabit (1-Gbps) Ethernet lines. As described above, regarding low-speed lines, the structure accommodates the lines in a plurality of ports, providing as many ports as possible in a single line interface, thereby preventing switching resources from being wasted.

In the future, it is expected that data traffic will increase, and consequently, still larger-capacity switches for supporting higher-speed lines will be required. On the other hand, if links to access port of networks and compatibility with conventional equipment are considered, it will be necessary to support conventional low-speed lines as well.

FIG. 4 shows an example of a switch structure. A crossbar switch 850 comprises a plurality of input ports and a plurality of output ports sized in 40-Gbps units, and switches up to n×n connections between the input and output ports. The crossbar switch 850 and line interfaces 821–824 are physically interconnected by a 40-Gbps driver (transmitting unit) 830 and a 40-Gbps receiver (receiving unit) 831. Especially in large capacity switches of several hundreds-Gbps to several-Tbps classes, physical connections between the crossbar switch 850 and the line interfaces may be realized by optical components, such as optical interconnecting modules. Based on the same concept as in FIG. 3, the switch shown in FIG. 4 supports not only a 40-Gbps line interface, but also various types of lower-speed lines. Although the crossbar switch 850 has a capability of switching in units of 40-Gbps, it is practically impossible, for example, to support sixteen 2.4-Gbps lines or forty gigabit-Ethernet lines in one line interface, because the increase of the components restricts the mounting area of the line interface. Therefore, the number of 2.4-Gbps lines is limited to around eight (line interface 823) and the number of gigabit-Ethernet lines is limited to around eight (line interface 824), resulting in low capacity densities of the line interfaces. In this case, it would be redundant to use the 40-Gbps driver 830, the 40-Gbps receiver 831, or the optical interconnect module for connections between low-capacity-density line interfaces and the crossbar switch 850, and this would also be undesirable from the viewpoints of the mounting area and the cost of the parts. This problem is caused not by the speeds of the driver and receiver shown in FIG. 4 or the speeds of the lines being accommodated, but generally by mixed accommodation of high-speed and low-speed lines in one switch.

A conventional input-output buffer type crossbar switch as described in document 1 performs switching between input and output ports on a one-to-one connection basis. Therefore, if there are a plurality of low-speed line interfaces and a plurality of high-speed line interfaces and they are all connected to the crossbar switch, it is impracticable to provide a connection from a certain high-speed line to a plurality of low-speed lines at one time, or a connection from a plurality of low-speed lines to a high-speed line. Therefore, the utilization efficiency of the switch may be lowered significantly. In other words, conventional crossbar switches do not support one-to-many or many-to-one connections between input and output ports, so mixed usage of low-speed and high-speed line interfaces may cause a so-called "blocking" phenomenon, in which data cannot be sent out from the switch even though the desired output port is available.

SUMMARY OF THE INVENTION

One aspect of the present invention defines the number of connection ports between line interfaces and a crossbar switch according to the speeds of the lines accommodated in each of the line interfaces. An embodiment of the present invention uses one port for input and output connections between a low-speed line interface part and a crossbar switch; and n ports for input and output connections between a high-speed line interface and the crossbar switch. A scheduler that determines connections among input and output ports of the crossbar switch receives a request from the low-speed line interface and receives a request from each port of the high-speed line interface, or n requests in total.

The scheduler determines input-output connection relationships based on the requests received from all ports, and gives each port a notice of grant or refusal. If its request is granted, a low-speed line interface sends out the relevant packet to the designated destination output. A high-speed line interface similarly sends out an applicable packet to the designated destination output from each of the n ports. If a high-speed line interface is given a plurality of grants for a single destination output, it successively reads out a plurality of packets from queue buffers corresponding to the destination outputs. If a high-speed line interface is given a plurality of grants to a plurality of destination outputs, it sequentially reads out packets from queue buffers corresponding to the destination outputs.

Another aspect of the present invention comprises a scheduler controlling a crossbar switch so that the ingress of a low-speed line interface is connected to an egress of a low-speed line interface or an egress of a single high-speed line interface, and the ingress of a high-speed line interface part is connected to up to n egresses of first line interfaces or one egress of a second line interface.

BRIEF DESCRIPTION OF THE DRAWINGS

FIG. 16 is a diagram showing a data format used for scheduling of a packet communication system according to invention.

FIG. 17 is a diagram showing a data format used for scheduling of a packet communication system according to the present invention.

FIG. 18 is a diagram showing a data format used for scheduling of a packet communication system according to the present invention.

FIG. 19 is a diagram showing a data format used for scheduling of a packet communication system according to the present invention.

DETAILED DESCRIPTION OF THE PREFERRED EMBODIMENTS

Figure 2:
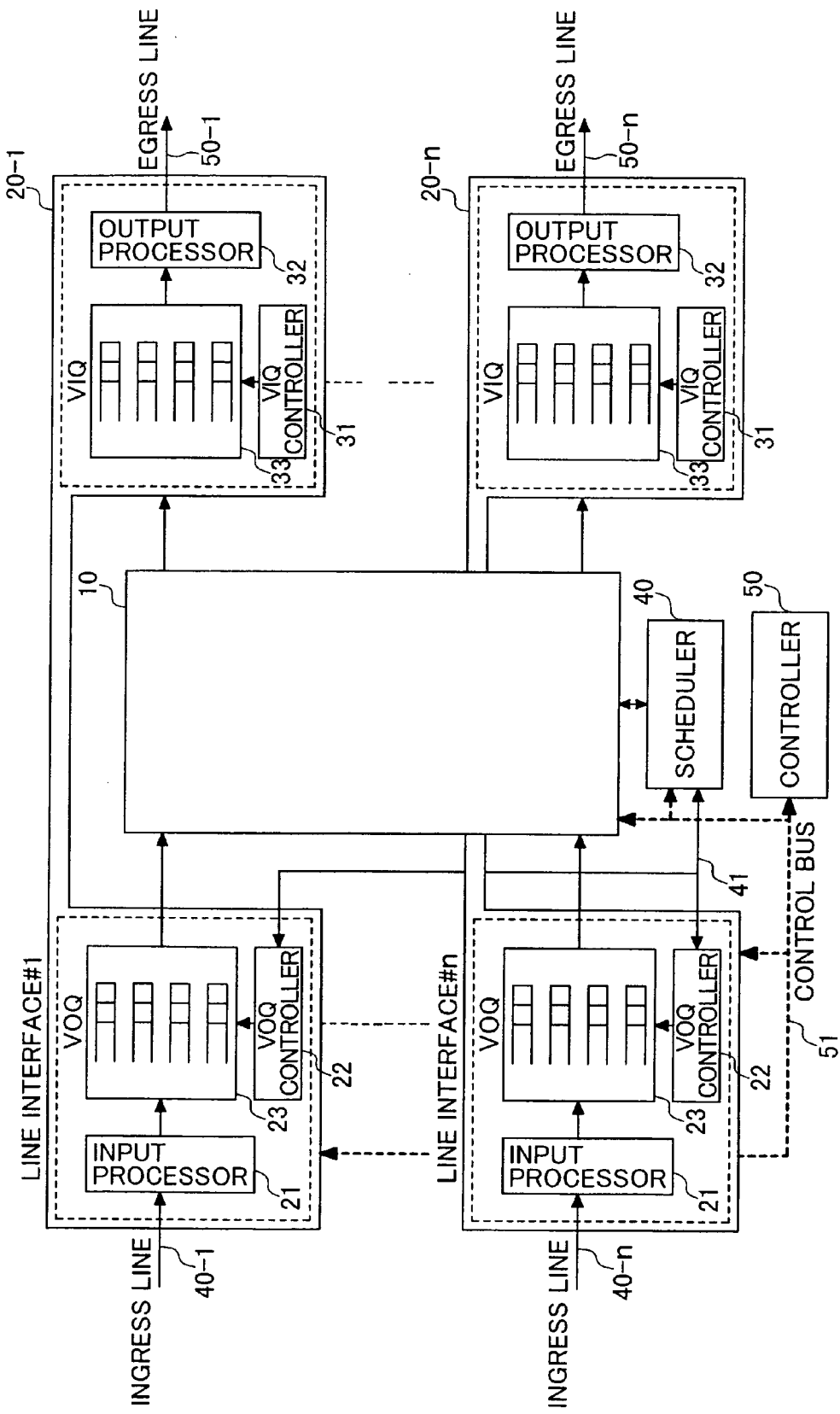
FIG. 2 is a block diagram showing the structure of a packet communication system according to the invention.
Figure 3:
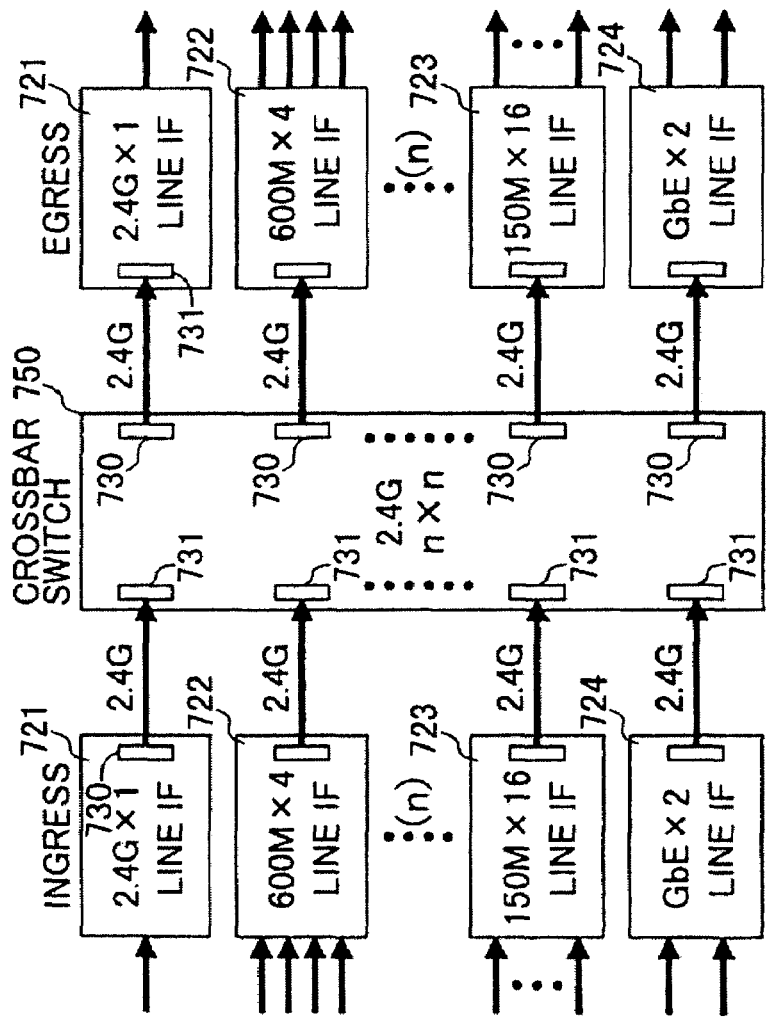
FIG. 3 is a block diagram showing the structure of a prior art packet communication system.
Figure 4:
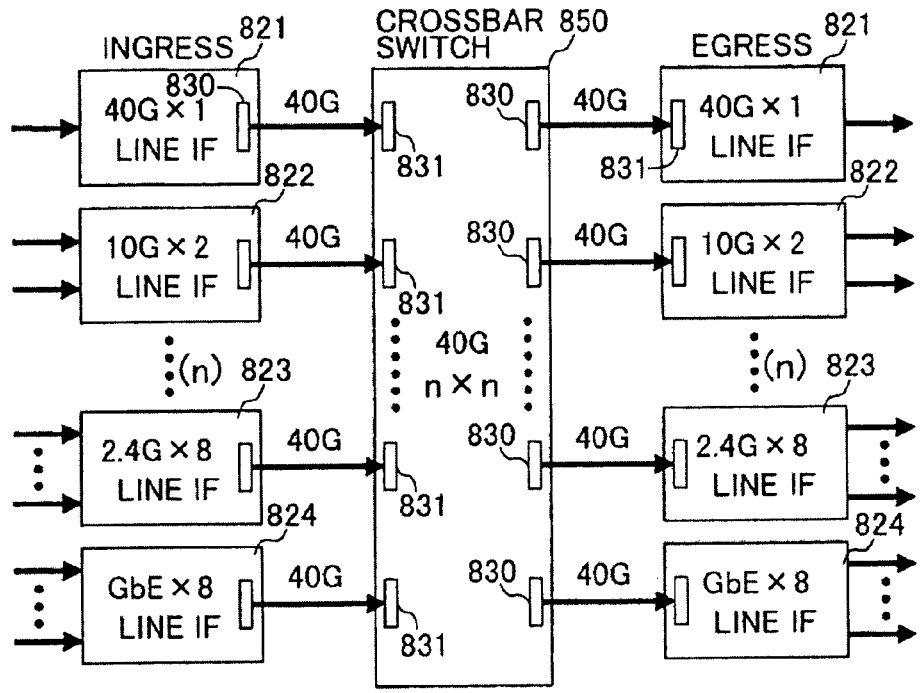
FIG. 4 is a block diagram showing the structure of another prior art packet communication system.

FIG. 2 shows an embodiment of a packet communication system according to the present invention. This packet communication system comprises a crossbar switch 10 that switches n×n ports, line interfaces 20-1 to 20-n that are connected to the crossbar switch 10, and a scheduler 40. A controller 50 controls initialization, collection of statistical information, and collection of failure information for the above-mentioned components through a control bus 51.

The line interfaces 20 will now be described. The ingress of a line interface 20 includes an input processor 21, a VOQ (virtual output queue) 23, and a VOQ controller 22. The egress of the line interface 20 includes a VIQ (virtual input queue) 33, a VIQ controller 31, and an output processor 32.

Figure 14:
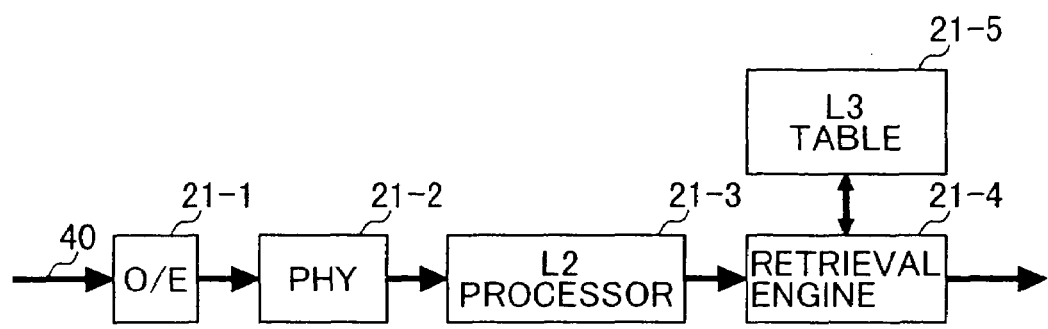
FIG. 14 is a block diagram showing the structure of the line interface card (ingress) of a packet communication system according to the present invention.

FIG. 14 shows an embodiment of the input processor 21. Packet data is input through an ingress line 40 to the input processor 21, where it is converted to an electrical signal at an optical/electrical (OE) converter 21-1. After that, PHY 21-2 performs physical layer processing, such as SONET (synchronous optical network) framing. Then, an L2 processor 21-3 performs layer 2 processing, such as packet extraction and error checks. Next, a retrieval engine 21-4 performs layer 3 processing such as retrieval of output port and quality of service class information using destination IP addresses. Retrieving processing specifically uses an L3TABLE 21-5 connected to the retrieval engine 21-4. The relationships among destination IP addresses, output ports, quality of service classes, and next hop IP addresses, which are the IP addresses of next transfer destinations, are pre-stored in the L3TABLE 21-5. Retrieval results are attached to the header field of the packets. The functions of the egress of the line interface 20 will be described later.

An example of a crossbar switch connected to two line interface cards, each of which accommodates a 40-Gbps line (40-Gbps input and output: referred to as a 40-Gbps line interface below) and two more line interfaces, each of which accommodates two 10-Gbps lines (20-Gbps input and output: referred to as a 20-Gbps line interface below) will now be described. The crossbar switch provides input and output port connections to the four installed line interfaces and performs 4×4 switching of input and output connections. The line slots of this packet communication system are assumed to accept any types of lines; either 40-Gbps or 20-Gbps line interfaces can be mounted thereon.

Figure 1:
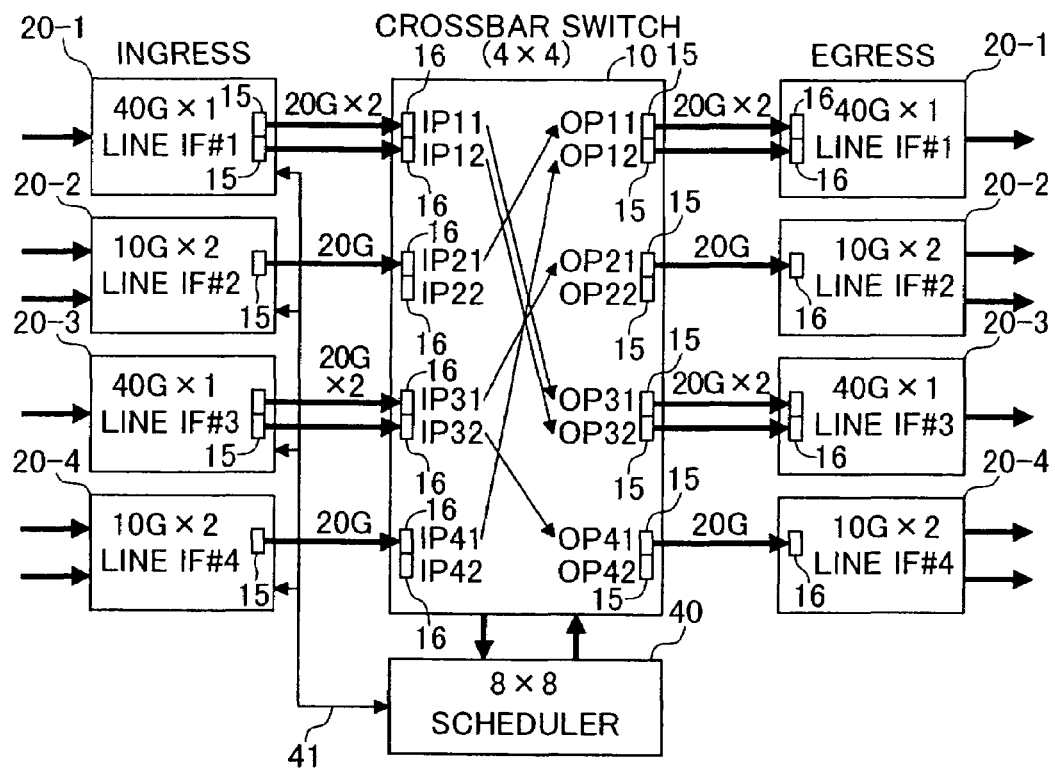
FIG. 1 is a block diagram showing the functional blocks of a packet communication system according to the present invention.

FIG. 1 shows an embodiment of a packet communication system comprising a crossbar switch 10 that switches 4×4 connections, line interfaces 20-1 to 20-4 that are connected to the crossbar switch 10, and a scheduler 40. In this embodiment, line interfaces 20-1 and 20-3 accommodate one 40-Gbps port each, and line interfaces 20-2 and 20-4 accommodate two 10-Gbps ports each. The ingresses of the line interfaces 20-1 and 20-3 are equipped with two 20-Gbps transmitting drivers 15 each and the egresses of the line interfaces 20-1 and 20-3 are equipped with two 20-Gbps receiving drivers 16 each. The ingresses of the line interfaces 20-2 and 20-4 are equipped with one 20-Gbps transmitting driver 15 each and the egresses of the line interfaces 20-2 and 20-4 are equipped with one receiving driver 16 each. The crossbar switch 10 puts two receiving drivers 16 and two transmission drivers 15 at each ingress and egress of a line interface slot. In addition, the crossbar switch 10 has two physical input and output ports per line interface slot, one corresponding to each input and output driver (for example, the input ports corresponding to the line interface 20-1 are IP11 and IP12, and the output corresponding to the line interface 20-1 are OP11 and OP12). The 40-Gbps line interfaces 20-1 and 20-3 and the crossbar switch 10 are interconnected by two 20-Gbps links; and, the 20-Gbps line interfaces 20-2 and 20-4 and the crossbar switch 10 are interconnected by a 20-Gbps link. The scheduler 40 periodically collects packet output request information from all of the line interfaces 20-1 to 20-4 through control lines 41, based on which it determines to have connection relationships among the line interfaces and issues grants to the line interfaces 20-1 to 20-4.

An embodiment of the scheduler 40 for determining the connection relationships among line interfaces will now be described. If a collision among a plurality of packet output requests for each egress line interface occurs, the scheduler 40 uses a round robin scheduling algorithm to select the ingress line interface to be connected. With prioritized output requests, the scheduler 40 determines the connection relationships among the input and output line interfaces in such a way that selection is made in order of priority. If output requests have the same priority, selection can be made based on round robin scheduling. Making these selections sequentially for each output line interface allows the connection relationships between input and output interfaces to be determined.

Although omitted in FIG. 1, the ingress of each line interface comprises, as shown in FIG. 2, an input processor 21, a VOQ controller 22, and a VOQ 23; the egress comprises a VIQ controller 31, an output processor 32, and a VIQ 33.

Figure 5:
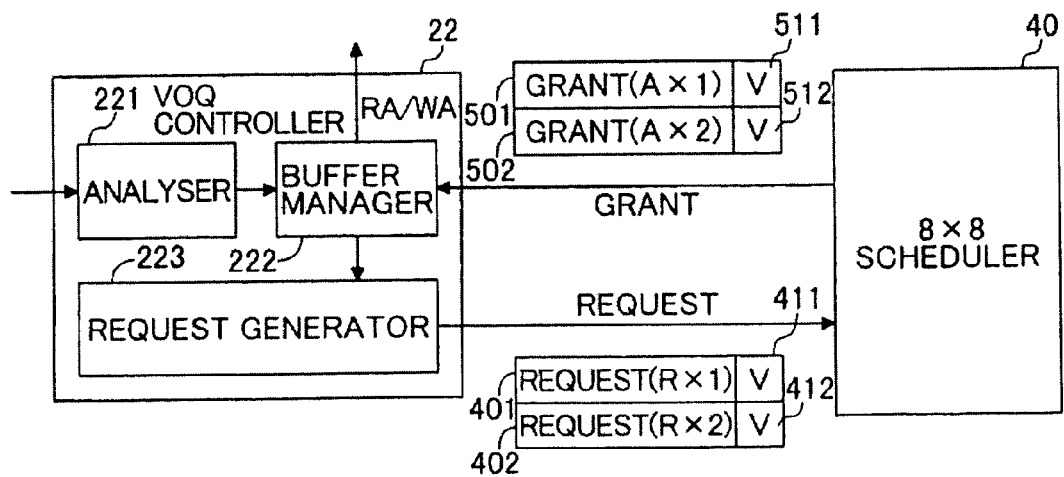
FIG. 5 is a block diagram showing the structure of the line interface and scheduler of a packet communication system according to the present invention.

FIG. 5 shows details of the VOQ controller 22, and transmitting and receiving formats between the VOQ a controller 22 and the scheduler 40. The VOQ controller 22 includes a header analyzer 221, a buffer manager 222, and a request generator 223. The header analyzer 221 analyzes the header of an input packet and notifies the buffer manager 222 of the result. The buffer manager 222, based on the information received from the header analyzer 221, sends out a WA (write address) to the VOQ 23 to write the packet into the desired queue buffer (corresponding to the egress line interface). The buffer manager 222 notifies the request generator 223 of packet storing information and sends the request to the scheduler 40. The scheduler 40 has a structure to receive two requests 401 and 402 for each line interface slot. The requests 401 and 402 have respective request valid bits (Vs) 411 and 412, which provide identification of a valid request. More specifically, a 40-Gbps line interface, as shown in FIG. 16, has the request valid bits (Vs) 411 and 412 both set to valid ("1"); and, a 20-Gbps line interface, as shown in FIG. 17, has the request valid bits (Vs) 411 and 412, one of which (411 in this example) is set to valid ("1"). That is, the scheduler 40 can receive two requests from the 40-Gbps line interface. The request generator 223 of the 40-Gbps line interface sets both the requests 401 and 402 to "1" for the queue buffer of an output port having two or more granted packets stored in the VOQ 23 (in this example, output #1), and sets only the request 401 to "1" for the queue buffer of an output port having only one granted packet stored (in this example 1 output #4). In the example of FIG. 1, the scheduler 40 receives up to six requests corresponding to physical ports of the crossbar switch 10. The scheduler 40 performs scheduling among six corresponding input and output ports of the crossbar switch 10 to determine the connection relationships. After determining the connection relationships, the scheduler 40 sends the requests back to the VOQ controller 22 of each line interface 20. The scheduler 40 is configured such that it can issue two grants 501 and 502 to each of the line interface slots. The grants 501 and 502 have grant valid bits (Vs) 511 and 512, respectively, which provide validity identification of grants. More specifically, the 40-Gbps line interface, as shown in FIG. 18, has both the grant valid bits 511 and 512 set to valid; and, the 20-Gbps line interface, as shown in FIG. 19, has either one of the grant valid bits (Vs) 511 and 512 (in this example, 511) is set to valid. That is, the scheduler 40 issues up to two grants (each of grants 501 and 502) to the 40-Gbps line interface and issues only one grant to the 20-Gbps line interface. The buffer manager 222 in the VOQ 22, on receipt of one or two grants, sends out an PA (read address) to the VOQ 23 to enable readout of one or two packets corresponding to the grants.

Based on the structure described above, three types of connections among the 20-Gbps line interfaces and 40-Gbps line interfaces will now be described: (1) a connection from the ingress of one 40-Gbps line interface to the egress of one 40-Gbps line interface; (2) a connection from the ingresses of two 20-Gbps line interfaces to the egress of one 40-Gbps line interface; and (3) a connection from the ingress of one 40-Gbps line interface to the egresses of two 20-Gbps line interfaces.

Figure 6:
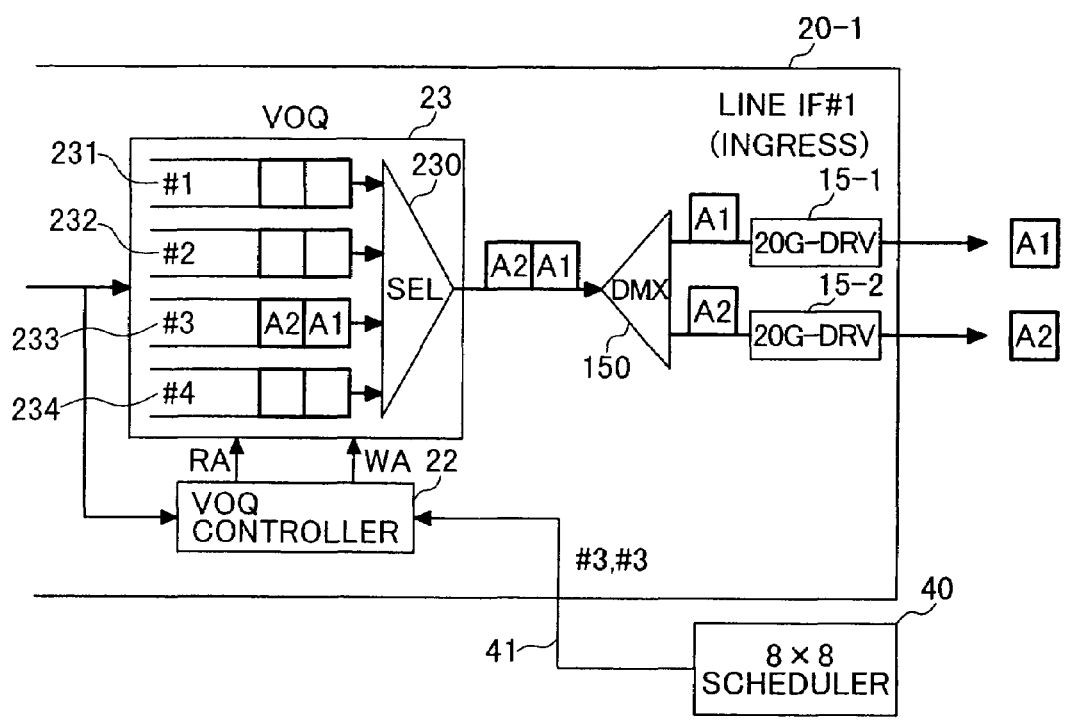
FIG. 6 is a block diagram showing the structure of the line interface card (ingress) of a packet communication system according to the present invention.
Figure 7:
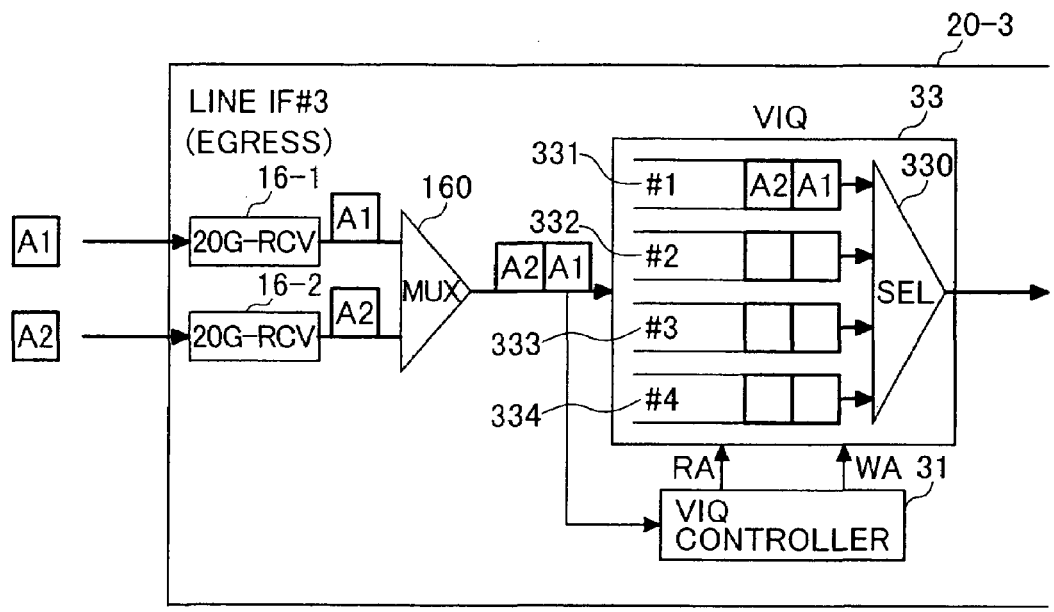
FIG. 7 is a block diagram showing the structure of the line interface card (egress) of a packet communication system according to the present invention.

First, the operation of the line interface 20-1 for the ingress of 40-Gbps line interface 20-1 connected to the egress of 40-Gbps line interface 20-3 will be described with reference to FIG. 6. The VOQ controller 22, on receipt of two grants for the egress line interface 20-3 from the scheduler 40 through the control line 41, gives two RAs to the VOQ 23 to read out two packets (A1 and A2) sequentially from the queue buffer 233 corresponding to the line interface 20-3. This is logically equivalent to selecting the queue buffer 233 from among the queue buffers 231 to 234 associated with the egress line interfaces 20-1 to 20-4 respectively to read out the packets. The two packets (A1 and A2) that have been read out are demultiplexed in a demultiplexer (DMX) 150 and output through the 20-Gbps drivers (20 G-DRVs) to the corresponding input ports IP11 and IP12 of the crossbar switch 10, respectively. These two packets (A1 and A2) are output from the desired output ports OP31 and OP32 of the crossbar switch 10 to the line interface 20-3. The operation of the egress of line interface 20ῐ3 will be described with reference to FIG. 7. Two packets (A1 and A2) are input to the line interface 20-3 through the 20-Gbp receivers (20 G-RCVs) 16. After that, the packets are multiplexed in a multiplexer (MUX) 160 and controlled by the VIQ controller 33 so as to be stored in a queue buffer therein corresponding to the relevant input line interface (in this case, queue buffer 331, because the packets are input from line interface 20-1). After being reconstructed to the original variable-length packets, the packets are read out by the VIQ controller 33, then sent to the output processor 32.

Figure 15:
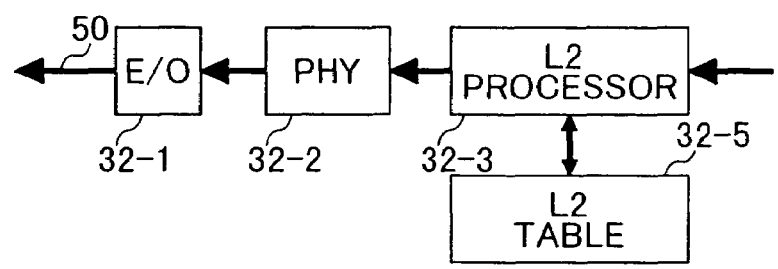
FIG. 15 is a block diagram showing the structure of the line interface card (egress) of a packet communication system according to the present invention.

The structure of the output processor will now be described with reference to FIG. 15. Input variable-length packets are subject to layer 2 processing in an L2 processor 32-3. If the output line is an Ethernet line, the layer 2 address (MAC address) of the communication system to be linked is retrieved from the next hop IP address, and this address is attached to the header fields of the packet. The correspondences between the next hop IP addresses and the layer 2 addresses of routers to be linked are stored in the L2TABLE 32-2. After the completion of layer 2 processing, the variable-length packets are mapped to a SONET frame, for example, and converted to optical signals at an electrical/optical (EO) converter 32-1, then sent out to an output line 50.

Figure 8:
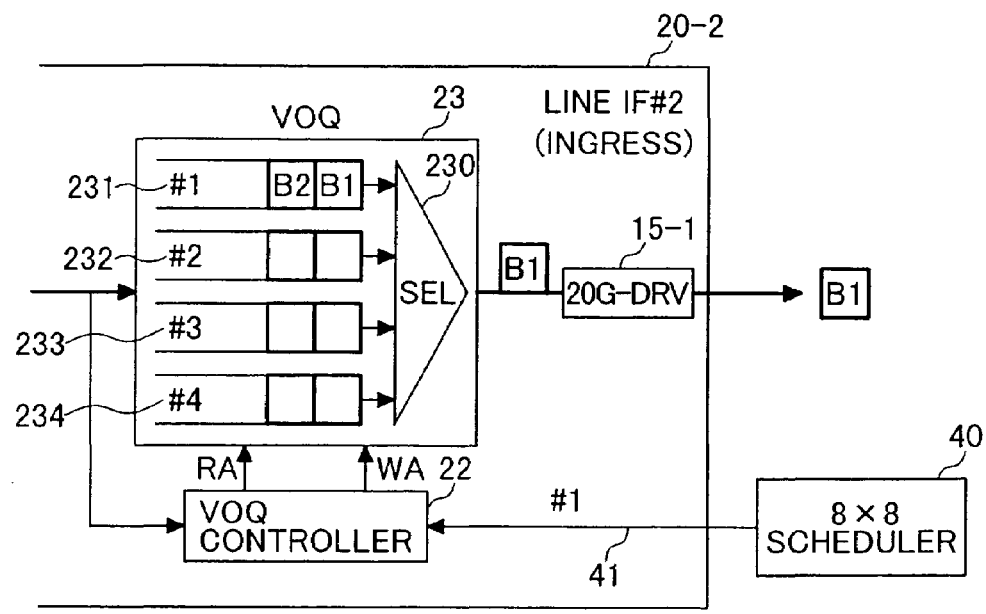
FIG. 8 is a block diagram showing the structure of the line interface card (ingress) of a packet communication system according to the present invention.
Figure 9:
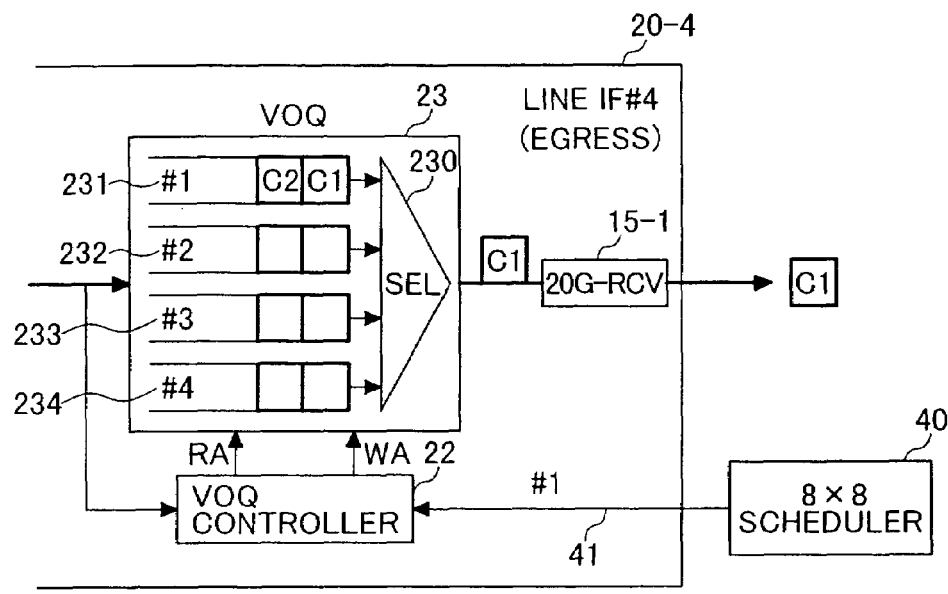
FIG. 9 is a block diagram showing the structure of the line interface card (egress) of a packet communication system according to the present invention.
Figure 10:
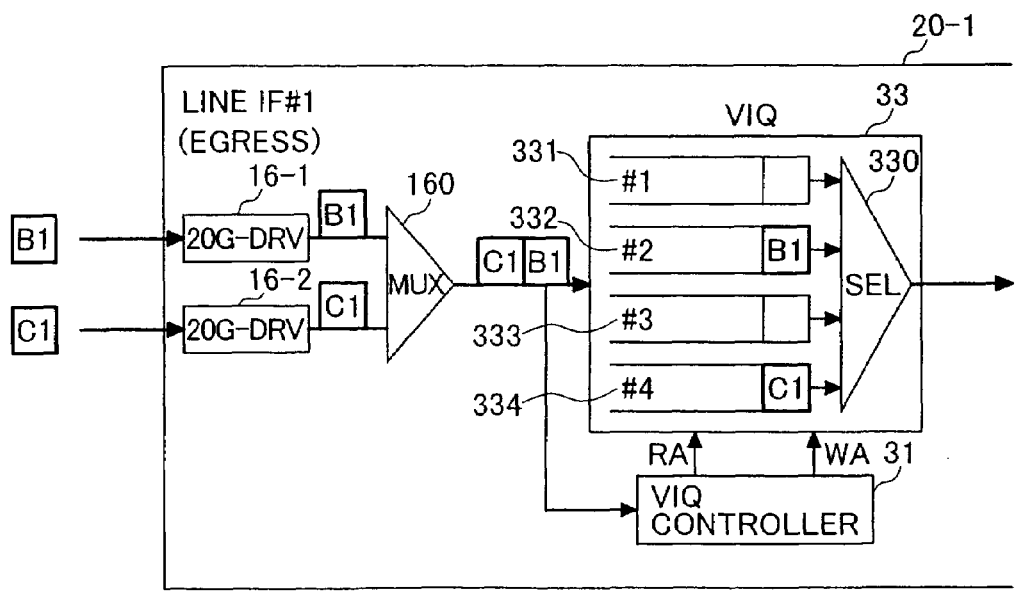
FIG. 10 is a block diagram showing the structure of the line interface card (egress) of a packet communication system according to the present invention.

Next, the operation of line interface 20-2, in the case where the ingresses of two 20-Gbps line interfaces 20-2 and 20-4 are connected to the egress of one 40-Gbps line interface 20-1, will be described with reference to FIG. 8. The VOQ controller 22, on receipt of one output grant to the egress line interface 20-1 from the scheduler 40 through the control line 41, gives one PA to the VOQ 23 to read out a packet (B1) from the queue buffer 231 associated with line interface 20-1. This is logically equivalent to selecting the queue buffer 231 from among the queue buffers 231 to 234 through the selector 230 to read out the packet (B1). The packet (B1) that has been read out is output to the corresponding input port IP21 of the crossbar switch 10 through the 20-Gbps driver (20 G-DRV) 15. The input port IP22 of the crossbar switch has nothing connected thereto. The packet (B1) is output to the line interface 20-1 through the desired output port OP11 of the crossbar switch 10. The operation of the line interface 20-4 will be described with reference to FIG. 9. The operation is similar to that in FIG. 8, so a redundant description will be omitted. A packet (C1) that has been read out from queue buffer 231 in line interface 20-4 is output to line interface 20-1 through the desired output port OP12 of the crossbar switch 10. The operation of the egress of the line interface 20-1 will be described with reference to FIG. 10. Two packets (B1 and C1) are input to line interface 20-1 though the 20-G receiver (20 G-RCV). After that, they are multiplexed in the multiplexer 160 and controlled by the VIQ controller 33 so as to be stored in a queue buffer associated with the relevant ingress line interface in the VIQ (queue buffer 332 for packet B1, and queue buffer 334 for packet C1).

Figure 11:
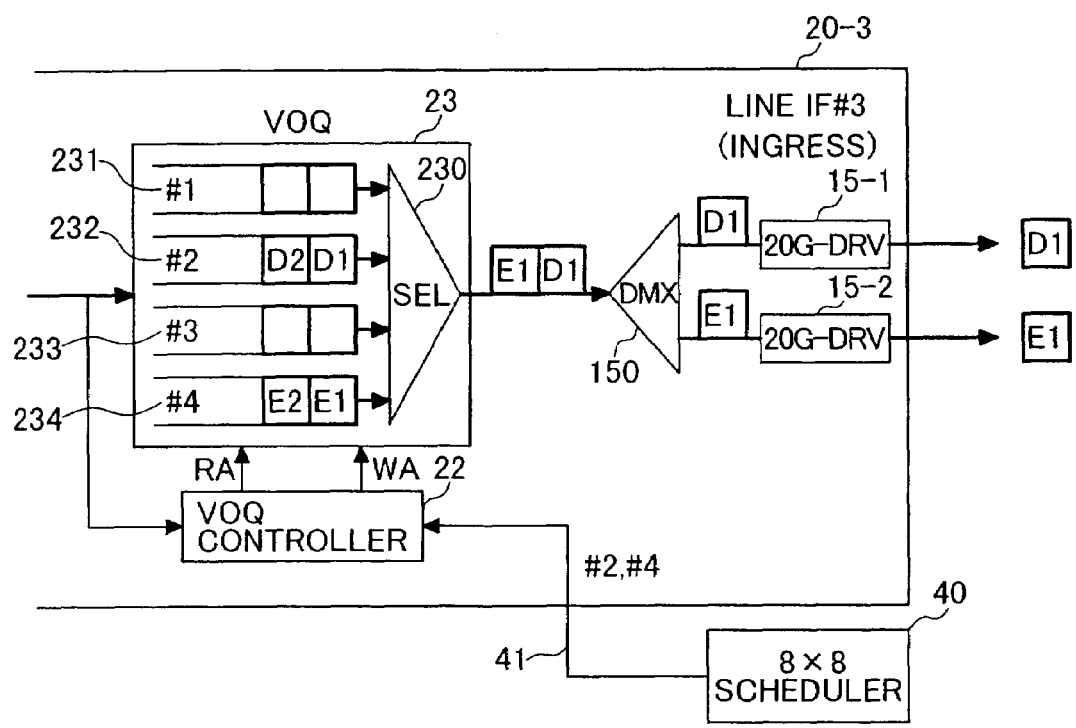
FIG. 11 is a block diagram showing the structure of the line interface card (ingress) of a packet communication system according to the present invention.
Figure 12:
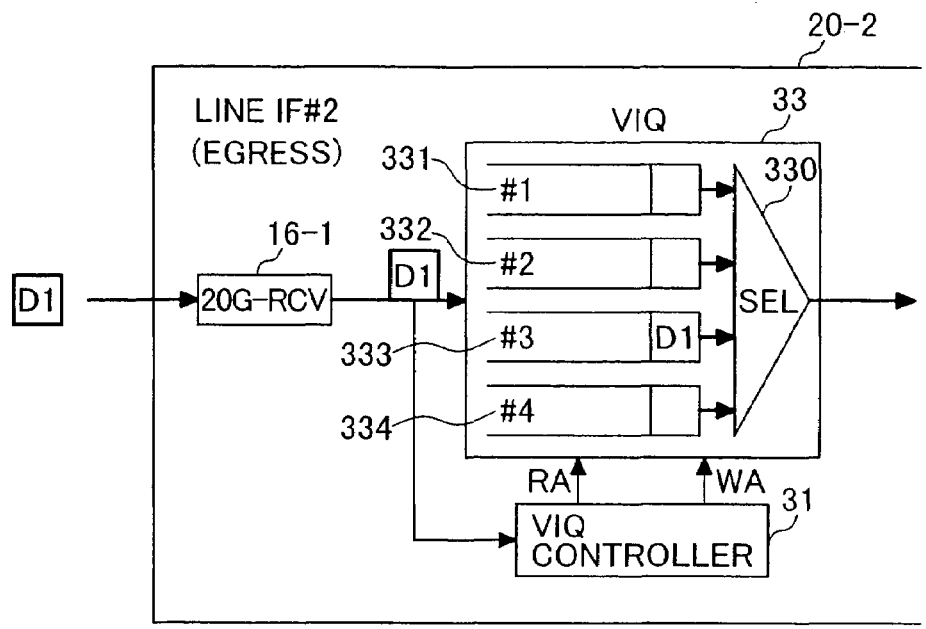
FIG. 12 is a block diagram showing the structure of the line interface card (egress) of a packet communication system according to the present invention.

Finally, the operation of line interface 20-3, in the case where the ingress of one 40-Gbps line interface 20-3 is connected to the egresses of two 20-Gbps line interfaces 20-2 and 20-4 simultaneously, will be described with reference to FIG. 11. The VOQ controller 22, on receipt of output grants to the egress line interfaces 20-2 and 20-4 through the control line 41 from the scheduler 40, gives two RAs to the VOQ 23 to read out a packet (D1) from the queue buffer 232 associated with line interface 20-2 and a packet (E1) from the queue buffer 234 associated with line interface 20-4 sequentially. The two packets (D1 and E1) that have been read out are demultiplexed in the demultiplexer (DMX) 150 and output through the 20-G drivers (20 G-DRV) 15 to the corresponding input ports IP31 and IP32 of the crossbar switch 10. The packet (D1) is output to the line interface 20-2 though the desired output port OP21 at the crossbar switch 10, and the packet (E1) is output to the line interface 20-4 through the desired output ports OP41 at the crossbar switch 10. Output ports OP22 and OP42 of the crossbar switch have nothing connected. The operation of the egress of the line interface 20-2 will be described with reference to FIG. 12. The packet (D1) is input to line interface 20-2 through the 20-Gbps receiver (20 G-DRV) 16 and is controlled so as to be stored in the queue buffer associated with the relevant ingress interface in the VIQ 23. The packet (D1) is reconstructed to the original variable-length packet, read out, and sent to the output processor 32.

Figure 13:
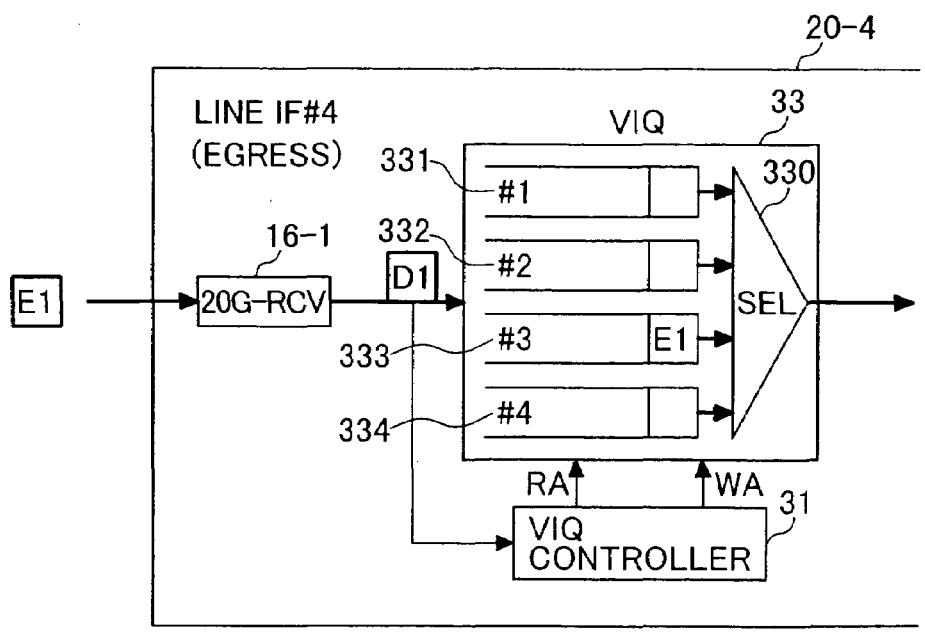
FIG. 13 is a block diagram showing the structure of the line interface card (egress) of a packet communication system according to the present invention.

FIG. 13 shows the processing of the egress of the line interface 20-4. It is similar to that in FIG. 12, so the description will be omitted.

Figure 24:
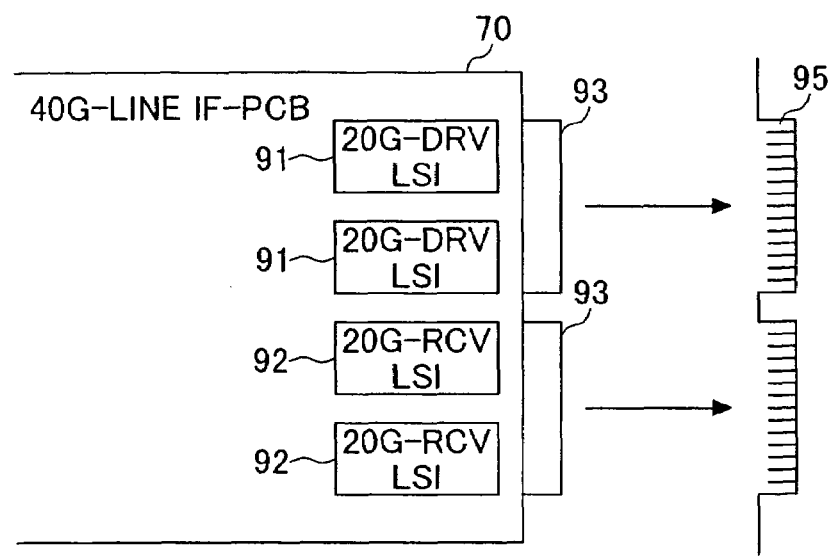
FIG. 24 is a block diagram showing the structure of a line interface card of a packet communication system according to the present invention.
Figure 25:
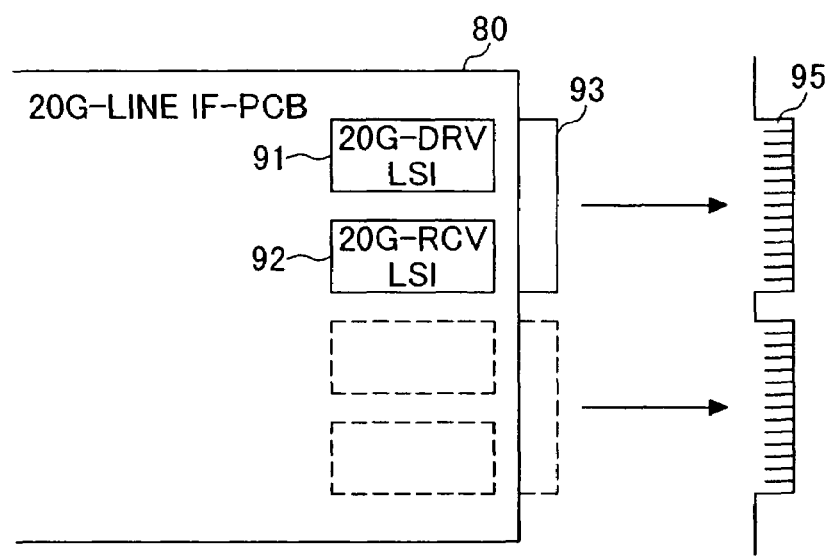
FIG. 25 is a block diagram showing the structure of a line interface card of a packet communication system according to the present invention.
Figure 26:
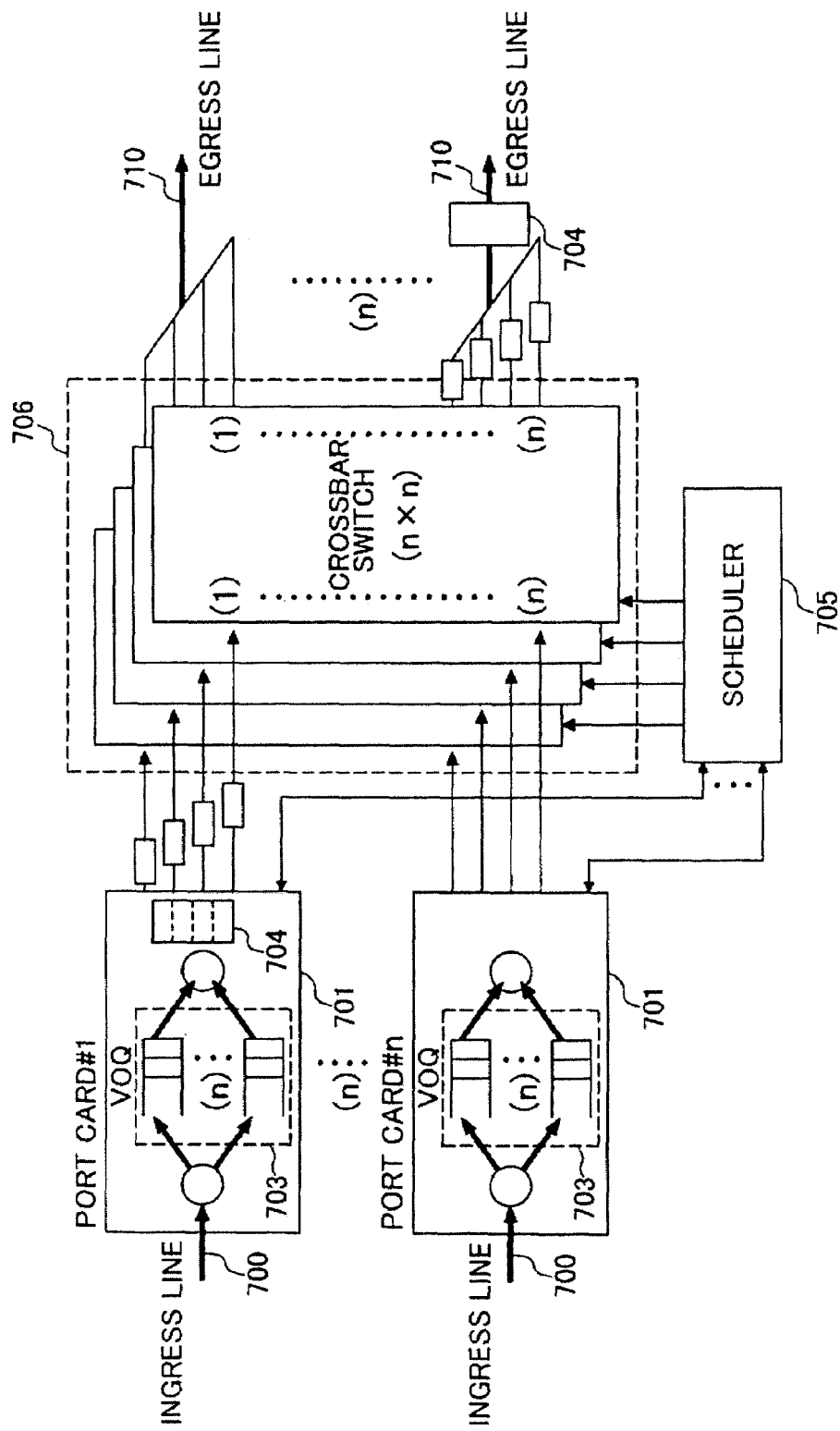
FIG. 26 is a block diagram showing a conventional large capacity packet switch.

The mounting of line interfaces according to the present invention is shown schematically in FIGS. 24 and 25. FIG. 24 shows the mounting of a 40-Gbps line interface 70. Two 20-Gbps drivers (LSI 91) and two 20-Gbps receivers (LSI 92) for connection with the crossbar switch 10 are mounted, and their input and output signals are connected to a back panel 95 through connectors S93. FIG. 25 shows the mounting of a 20-Gbps line interface 80. One 20-Gbps driver (LSI 91) and one 20-Gbps receiver (LSI 92) are mounted to connect to the crossbar switch 10, and their input and output signals are connected to the back panel 95 through a connector 93. Although line interfaces are connected to the crossbar switch with a back panel in this embodiment, in another embodiment, especially for large-capacity packet switching systems, optical components instead of electrical components can be applied to the connecting method.

As described above, according to this embodiment, in the configuration of a large-capacity packet communication system with high-density line interfaces accommodating high-speed lines and low-density line interfaces accommodating a plurality of low-speed lines, the low-speed line interfaces can be equipped with relatively fewer drivers and receivers (using optical components for optical connections) and the high-speed interfaces can be equipped with more drivers and receivers (using optical components for optical connections), so it becomes feasible to implement the line interfaces with cost linearity.

This embodiment also makes it possible to provide packet communication systems enabling one-to-many or many-to-one switching connections of the input and output ports between a plurality of low-speed line interfaces and a single high-speed line interface.

Although the embodiment described above represents a structure in which two links are provided between a high-speed line interface and a crossbar switch and one link is provided between a low-speed line interface and a crossbar switch, an expanded structure is also possible, in which nH links are provided between a high-speed line interface and a crossbar switch and nL links are provided between a low-speed line interface and a crossbar switch according to the speeds of the lines accommodated in the high-speed and low-speed line interfaces.

Figure 20:
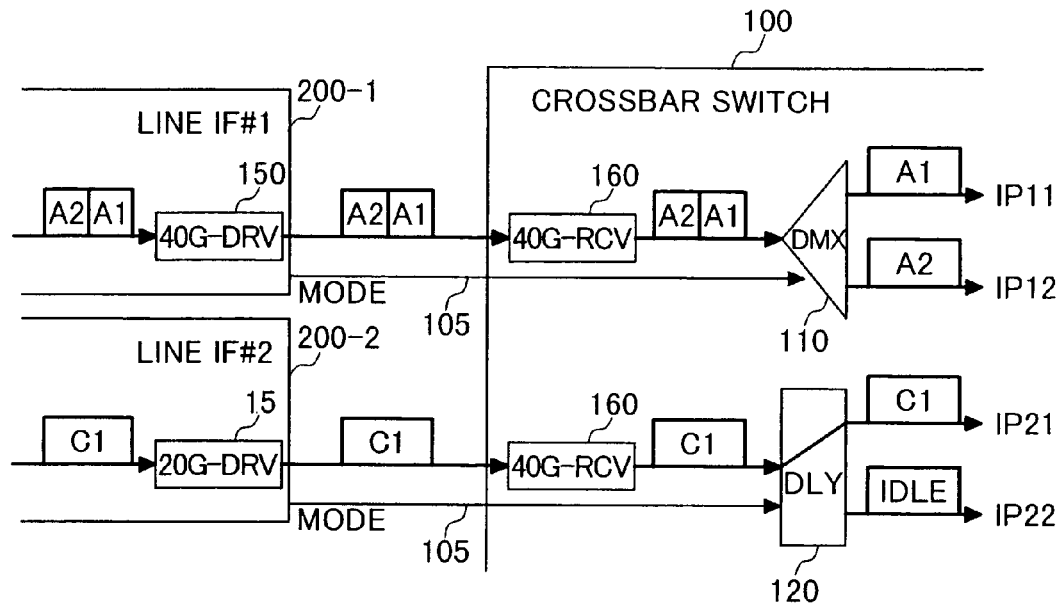
FIG. 20 is a block diagram showing the structure of a line interface card and crossbar switch of another packet communication system according to the present invention.
Figure 22:
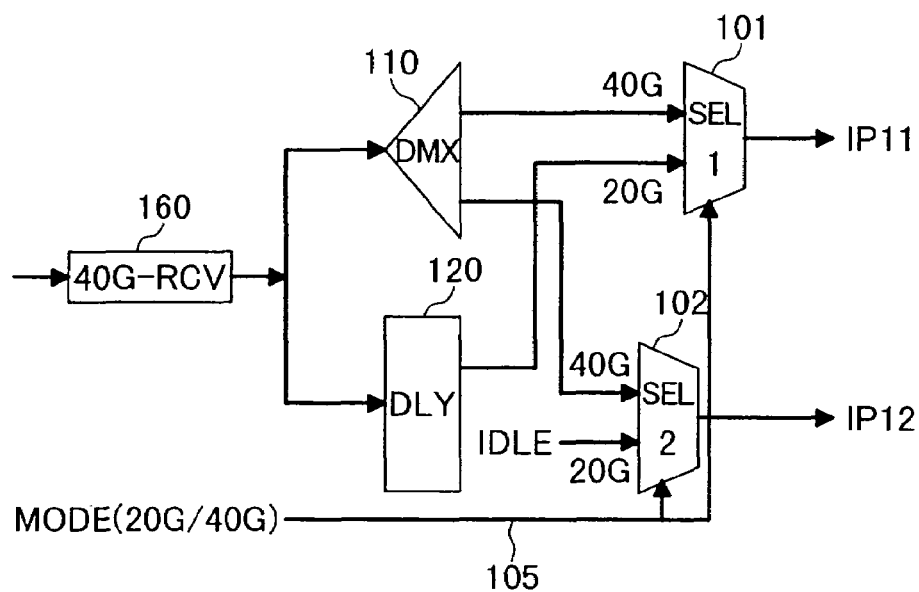
FIG. 22 is a block diagram showing the structure of the crossbar switch of another packet communication system according to the present invention.

Another embodiment provides a method changing the physical speeds of the connecting links according to the types of line interfaces for connections between a crossbar switch and the line interfaces. The packet flow from the line interfaces to the crossbar switch will be described with reference to FIG. 20. A 40-Gbps line interface 200-1 is equipped with a 40-Gbps driver (40 G-DRV) 150, and a 20-Gbps line interface 200-2 is equipped with a 20-Gbps driver (20 G-DRV) 15. The ingress side of a crossbar switch 100 is equipped with a 40-Gbps receiver (40 G-RCV) 160 for each slot. The 40-Gbps receivers (40 G-RCV) 160 that are installed on the ingress side of the crossbar switch 100 can receive both 40-Gbps and 20-Gbps arriving data. More specifically, on receipt of 20-Gbps data, the 40-Gbps receiver 160 can extract the data at half the rate used for receiving 40-Gbps data. If an interface slot of the crossbar switch 100 is equipped with the 40-Gbps line interface 200-1, the 40-Gbps receiver 160, on receipt of 40-Gbps data (A1 and A2), demultiplexes the date in a demultiplexer (DMX) 110 and inputs the data A1 and A2 to respective input ports IP11 and IP12 in the crossbar switch 100. On the other hand, if the interface slot is equipped with the 20-Gbps line interface 200-2, the 40-Gbps receiver 160, on receipt of 20-Gbps data (C1), sends C1 to a delay circuit (DLY) 120, where the data is delayed by a time interval equal to the time interval required for processing in the DMX 110; then, the data is input to input port IP21 in the crossbar switch 100. Input port IP22 has no data input. Mode selection of these line interface speeds is implemented in the structure shown in FIG. 22. In each slot of the crossbar switch 100, switching selectors SEL1 (101) and SEL2 (102) are provided for DMX 110 and DLY 120, respectively. More specifically, when 40-Gbps data is input, the data is demultiplexed at DMX 110 to be input to the input ports IP11 and IP12. When 20-Gbps data is input, the data is delayed at DLY 120 and input only to input port IP11. When line interfaces are installed, a level line signal 105 that varies depending on the capacity of the line interface board (for example, "1" for a 40-Gbps line interface board, and "0" for a 20-Gbps line interface board) is output, and selectors SEL1 (101) and SEL1 (102) are set according to this level line signal 105. Another structure is possible in which SEL1 (101) and SEL2 (102) can be set by software. The scheduling algorithm and the method of exchanging data requests and grant signals among the line interfaces 200 are the same as in the embodiment described above, so a description will be omitted.

Figure 21:
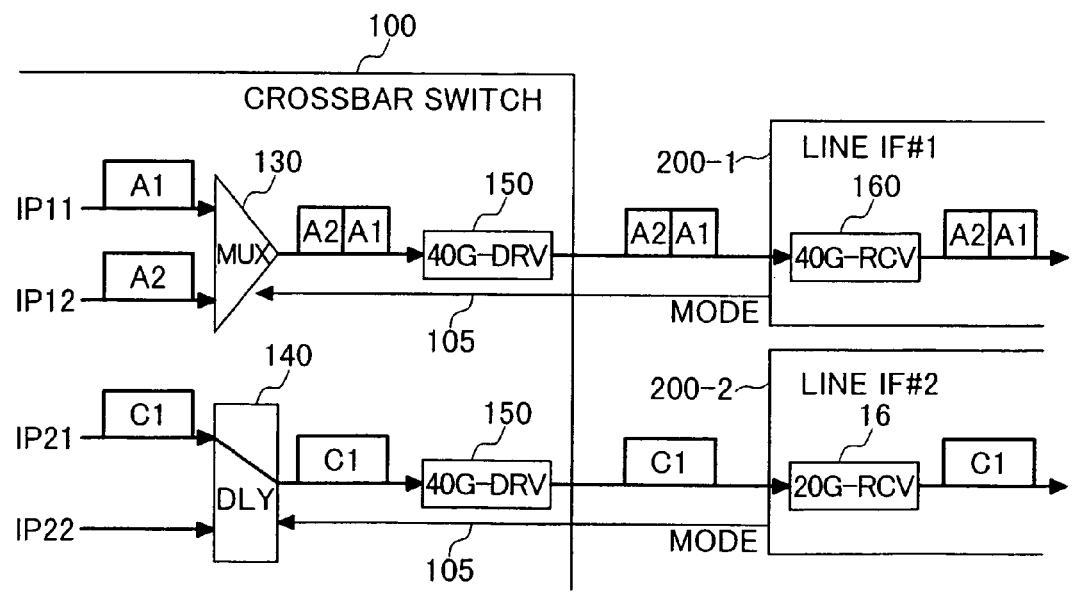
FIG. 21 is a block diagram showing the structure of a line interface card and crossbar switch of another packet communication system according to the present invention.
Figure 23:
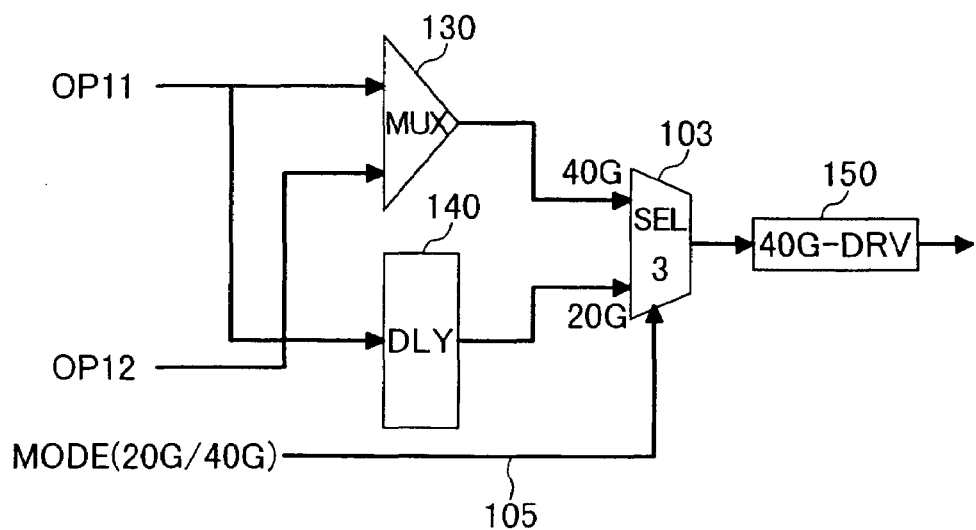
FIG. 23 is a block diagram showing the structure of the crossbar switch of another packet communication system according to the present invention.

Next, the packet flow from the crossbar switch to the line interfaces will be described with reference to FIG. 21. The egress of the crossbar switch 100 is equipped with a 40-Gbps driver 150 for each line interface slot. A 40-Gbps line interface 200-1 connected thereto is equipped with a 40-Gbps receiver 160; and, a 20-Gbps line interface 200-2 is equipped with a 20-Gbps receiver 16. The 40-Gbps driver 150 provided on the egress side of the crossbar switch 100 can send either 40-Gbps or 20-Gbps data. More specifically, if the opposite receiver 16 supports 20-Gbps, the 40-Gbps driver 150 can send data at half the 40-Gbps rate. If the 40-Gbps line interface 200-1 is installed on the crossbar switch 100, the data (A1 and A2) that has been output from the output ports OP11 and OP12 of the crossbar switch 100 is multiplexed at a multiplexer (MUX) 130 and is sent as a 40-Gbps multiplexed signal to the line side. If the 20-Gbps line interface 200-2 is installed on the crossbar switch 100, the data (C1), when received from the output port OP21, is delayed in the delay circuit (DLY) 140 by a time interval equal to the time interval required for processing in the MUX 130 and is sent as a 20-Gbps signal to the line interface. Nothing is output from output port OP22. Mode selection for these line interface speeds is implemented in the structure shown in FIG. 23. A switching selector SEL3 (103) for MUX 130 and DLY 140 is provided for each slot of the crossbar switch 100. More specifically, 40-Gbps data is output from output ports OP11 and OP12, then multiplexed in MUX 130. 20-Gbps data is output from output port OP11 and delayed in DLY 140. Regarding the switching selector SEL3 (103), when line interfaces are installed, a level line signal 105 that varies depending on the capacities of the line interface boards is output (for example, "1" for a 40-Gbps line interface board, and "0" for a 20-Gbps line interface board) to select the mode. Another structure is possible in which selectors SEL1 (101) and SEL2 (102) can be set by software.

As described above, according to this embodiment, in the configuration of a large-capacity packet communication system with high-density line interfaces accommodating high-speed lines and low-density line interfaces accommodating a plurality of low-speed lines, drivers and receivers (optical components for optical connections) corresponding to the line interface speeds can be installed, whereby the line interfaces can be implemented with cost linearity. In addition, packet communication systems enabling one-to-many or many-to-one input-output port connections between a plurality of low-speed line interfaces and a high-speed line interface can be provided.

According to the embodiments described above, the following effects can be expected:

(1) In the configuration of a large-capacity packet communication system, a system with high-density line interfaces accommodating high-speed lines and low-density line interfaces accommodating a plurality of low-speed lines can be provided, the number of switch-to-switch physical links being proportional to the capacities of the line interfaces;

(2) A packet communication system enabling data transfer between a plurality of low-speed line interfaces and a high-speed line interface can be provided. More specifically, one-to-many or many-to-one connections between ingress and egress line interfaces become possible, whereby a packet communication system in which traffic blocking does not occur can be provided.

In a packet communication system having mixed line interfaces accommodating high-speed lines and line interfaces accommodating low-speed lines, efficient packet switching can be performed.

What is claimed is:

1. A packet communication system comprising:
   a first line interface;
   a second line interface connectable to a line with a speed lower than that of a line connected to the first line interface;
   a crossbar switch; and
   a scheduler that receives packet output requests from the first line interface and the second line interface periodically, and sends packet grants for the crossbar switch accordingly to the first and second line interfaces,
   wherein a link capacity between the first line interface and the crossbar switch is larger than a link capacity between the second line interface and the crossbar switch, and
   wherein the number of links forming the link capacity between the first line interface and the crossbar switch is greater than the number of links forming the link capacity between the second line interface and the crossbar switch, and
   wherein said scheduler controls said crossbar switch based on the relative link capacities between the first line interface and the crossbar switch and between the second line interface and the crossbar switch.

2. The packet communication system of claim 1, wherein the scheduler receives more packet output requests from the first line interface than from the second line interface in the same cycle.

3. The packet communication system of claim 1, wherein the ratio of the maximum number of packet output requests received by the scheduler from the first line interface to the maximum number of packet output requests received from the second line interface in the same cycle equals the ratio of the number of links between the first line interface and the crossbar switch to the number of links between the second line interface and the crossbar switch.

4. The packet communication system of claim 1, wherein the scheduler receives packet requests of up to the number of links between the first line interface and the crossbar switch from the first line interface, and receives packet requests of up to the number of links between the second line interface and the crossbar switch from the second line interface.

5. The packet communication system of claim 1, wherein the scheduler sends more packet grants to the first line interface than to the second line interface.

6. The packet communication system of claim 1, wherein the scheduler sends the first line interface a grant of up to a number of packets equal to the number of links between the first line interface and the crossbar switch, and sends the second line interface a grant of up to a number of packets equal to the number of links between the second line interface and the crossbar switch.

7. A packet communication system comprising:
a plurality of first line interfaces;
a plurality of second line interfaces each having a speed equal to n times the speed of one of the plurality of first line interfaces, where n is a number greater than one;
a crossbar switch that is connected to the plurality of first line interfaces and the plurality of second line interfaces;
a scheduler that periodically receives packet output requests from the plurality of first line interfaces and the plurality of second line interfaces, controls the crossbar switch accordingly, and periodically sends packet grants for the crossbar switch to the plurality of first line interfaces and the plurality of second line interfaces,
wherein each of the plurality of second line interfaces is connected to the crossbar switch by a number of links of equal to n times the number of links that provide connections between the plurality of first line interfaces and the crossbar switch,
wherein the scheduler controls the crossbar switch in such a way that the ingress of each one of the plurality of first line interfaces is connected to the egress of another one of the first line interfaces or the egress of one of the second line interfaces, and the ingress of each one of the second line interfaces is connected to the egresses of up to n ones of the first line interfaces or the egress of another one of the second line interfaces, and
wherein said scheduler controls the crossbar switch based on the relative number of links between each first line interface and the crossbar switch and between each second line interface and the crossbar switch.

8. The packet communication system of claim 7, wherein the scheduler, in the same cycle, gives grants to the second line interfaces to send out up to n times as many packets as the maximum number of packets granted to the first line interfaces to be sent out to the crossbar switch.

9. The packet communication system of claim 7, wherein the ingress and egress of each one of the plurality of first line interfaces are connected to the crossbar switch with a single link each, and wherein the ingress and egress of each one of the plurality of second line interfaces are connected to the crossbar switch with n links.

10. The packet communication system of claim 9, wherein the ingress of each one of the plurality of first line interfaces has a transmitting driver connected to the single link,
wherein the egress of each one of the plurality of first line interfaces has a receiver that is connected to the single link,
wherein the ingress of each one of the plurality of second line interfaces has n transmitting drivers that are connected to the n links, and
wherein the egress of each one of the plurality of second line interfaces has n receivers that are connected to the n links.

11. A packet communication system comprising:
a plurality of first line interfaces;
a plurality of second line interfaces each having a speed n times higher than the speed of the first line interface;
a crossbar switch that connects the plurality of first line interfaces and the plurality of second line interfaces;
a scheduler that periodically receives packet output requests from the plurality of first line interfaces and the plurality of second line interfaces, controls the crossbar switch accordingly, and periodically sends grants for the crossbar switch to the plurality of first line interfaces and the plurality of second line interfaces,
wherein each of the plurality of first line interfaces is connected to the crossbar switch with a link speed V,
wherein each of the plurality of second line interfaces is connected to the crossbar switch with a link speed n×V, where n is a number greater than one,
wherein the scheduler controls the crossbar switch in such a way that the ingress of each one of the first line interfaces is connected to the egress of one of the first line interfaces or an egress of one of the second line interfaces and the ingress of each one of the second line interfaces is connected to up to n egresses of the first line interfaces or the egress of another one of the second line interfaces, and
wherein the scheduler controls the crossbar switch based on the relative link speeds between each first line interface and the crossbar switch and between each second line interface and the crossbar switch.

12. The packet communication system of claim 11, wherein the scheduler, in the same cycle, gives grants to the second line interfaces to send up to n times as many packets as the maximum number of packets granted for the first line interfaces to send to the crossbar switch.

* * * * *